United States Patent [19]

Tsubakiyama

[11] Patent Number: 5,544,245
[45] Date of Patent: Aug. 6, 1996

[54] MUTUAL AUTHENTICATION/CIPHER KEY DELIVERY SYSTEM

[75] Inventor: Hideki Tsubakiyama, Ohmiya, Japan

[73] Assignee: Kokusai Denshin Denwa Kabushiki Kaisha, Tokyo, Japan

[21] Appl. No.: 252,847

[22] Filed: Jun. 2, 1994

[30] Foreign Application Priority Data

Jun. 10, 1993 [JP] Japan .................... 5-163898

[51] Int. Cl.$^6$ .................................... H04K 1/00
[52] U.S. Cl. .................. 380/21; 380/23; 380/25; 380/30; 380/46
[58] Field of Search ................... 380/4, 21, 23, 380/25, 30, 46, 49

[56] References Cited

U.S. PATENT DOCUMENTS 5,245,506   9/1994   Tsubakiyama et al. ............ 380/23

5,390,245   2/1995   Dent et al. ............................ 380/23

*Primary Examiner*—David C. Cain
*Attorney, Agent, or Firm*—Emmanuel J. Lobato

[57] ABSTRACT

The network and each user i share an encryption algorithm $EK_i()$ using his authentication key $K_i$ as a cipher key, its inverse function $EK_i^{-1}()$, a specific function $F()$ and its inverse function $F^{-1}()$, and a function $G()$. The network calculates $C_1=EK_i(F(r_n, r_u))$, using a random number $r_n$ generated by the user and a random number by the network, and sends it to the user. The user calculates $(d_1, d_2)=F^{-1}(EK_i^{-1}(C_1))$ and, if $d_1=r_n$, judges the network to be an authorized one. The user generates a random number $r_c$ and sends $C_2=EK_i(F(d_2, r_c))$ to the network. The network calculates $(d_3, d_4)=F^{-1}(EK_i^{-1}(C_2))$ and, if $d_3=r_u$, judges the user to be an authorized one.

2 Claims, 2 Drawing Sheets

MUTUAL AUTHENTICATION/CIPHER KEY DELIVERY SYSTEM

BACKGROUND OF THE INVENTION

The present invention relates generally to information or data security technology for communication networks using an encryption/decryption device and, more particularly, to technology for preventing abuse of the network in a personal mobile communication system.

The technology for information security of the system in the communication network is roughly divided into (a) a user authentication technique which prevents an unauthorized access to the network by making a check to see if a user is an authorized one, and (b) a cryptographic technique which conceals communication contents on the circuit being actually used, thereby preventing eavesdropping by a third party.

With respect to the authentication technique (a), CCITT has proposed, as an authentication technique for future personal communication technology, a system such as shown in FIG. 3, in which the network and all users employ identical encryption devices and the network authenticates the users individually without presenting or revealing their passwords or similar personal authentication key on the circuit. Let the identifier of the user named i and his authentication key be represented by $ID_i$ and $K_i$, respectively, and assume that $K_i$ is known only to the network and the user named i. When the user i wants to use the network, he presents first the information $ID_i$ to the network. Then the network generates and sends a random number $r_u$ to the user i. The user i encrypts the random number $r_u$ with the encryption device using the authentication key $S_i$ as a cipher key and sends the encrypted random number to the network. Finally, the network encrypts the random number $r_u$ using the authentication key of the user i held therein as a cipher key and, when the value of the thus encrypted random number matches with the value of the encrypted random number sent from the user i, authenticates the party A (the user i) as an authorized user. This system requires a total of three interactions between the user and the network, including the presentation of the identification of the user to the network.

Thereafter, to prevent eavesdropping by the outsider (b), some key delivery system is used to implement key sharing between the network and the user. Finally, they use the shared cipher key to encrypt correspondence and start communication between them.

As mentioned above in connection with the prior art, attention has been directed primarily to the function or feature that the network authenticates the user. This is because the system has been designed on the understanding that the network is always correct or error-free. In personal communications, however, it is supposed that a base station, which covers a very narrow communication range, effects a position registration accompanying its communication with the user or his migration; hence, there is a possibility that an abuser sets up a false base station and accesses the user via a radio channel. In such a situation, if the user would use his authentication key as a key to encrypt a proper numeral intentionally chosen by the false network and send it back thereto, the false network could obtain a plaintext and a ciphertext which would allow it to attack the encryption algorithm in the authentication protocol used. This is a chosen plaintext attack by the false network on the encryption algorithm in the authentication protocol, and it is pointed out in a literature (E. Biham and A. Shamir, "Differential crypro-analysis of DES-like cryptosystem," '90 EUROCRYPTO, August 1990) that there is a fear that according to the choice of the cipher system, user's authentication key would be revealved by several rounds of such chosen plaintext attacks. Thus, the conventional system has a construction which allows the chosen plaintext attack on the user encryption algorithm. Furthermore, simply by eavesdropping communications between the valid user and the network, a third party could acquire a numeral chosen by the valid network and its encrypted version obtained using the user's secret key as an encryption key. This indicates that an ordinary eavesdropper could make the known plaintext attack on the encryption algorithm in the authentication protocol, and it is pointed out in a literature (Makoto Matsui, "Linear Cryptanalysis of DES cryptosystems (I)," Cryptosystem and Information Security Symposium SCI93, January 1993) that there is the likelihood that according to the choice of the cipher system, user's authentication key would be revealed by several rounds of the known plaintext attack. Since the effectiveness of the known plaintext attack has been reported, the authentication protocol needs to have a construction which is free from the known plaintext attack as well as the chosen plaintext attack on the encryption algorithm, but in the conventional system the protocol is still unable to avoid these attacks.

Besides, according to the prior art system, since the network only authenticates the user, a key necessary for cipher communications must be delivered separately of the user authentication. This inevitably causes an increase in the number of communications or interactions and an increase in the amount of data to be processed for communication.

SUMMARY OF THE INVENTION

An object of the present invention is to provide a mutual authentication/cipher key delivery system which obviates the above-mentioned problems of the prior art, enables the network and each user to authenticate each other without inviting the chosen plaintext attack and the known plaintext attack on the encryption algorithm in the authentication protocol and permits the delivery of a key for cipher communication without the need of increasing the amount of data to be transmitted for the protocol for mutual authentication between the network and each user.

The above-mentioned problems could be solved by the present invention which adopts the following techniques characteristic of the invention.

In one aspect, the present invention relates to a mutual authentication system in which a communication network and its all users have devices for implementing a common key cryptosystem; identifier $ID_i$ of a user named i is made public in said network; an authentication key $K_i$ of the user named i is known only to the network and the user named i; and in which each user generates a random number $r_n$ for authentication of the network and sends it and his identifier $ID_i$ to the network; the network inputs into a specific function F() the random number $r_n$ received from the user and a random number $r_u$ generated by the network itself, encrypts the resulting output value $F(r_n,r_u)$ by an encryption algorithm $E1K_i()$ using the authentication key $K_i$ of the individual user as a cipher key and sends the encrypted data $C_1$ to the user concerned; and the user obtains $D_1$ by inputting the data $C_1$ into an inverse function $E1K^{-1}K_i()$ of the encryption algorithm $E1K_i()$ using the user's authentication key $K_i$ as a cipher key, inputs the $D_1$ into an inverse function $F^{-1}()$ of the above-mentioned function $F()$ and judges the network to be valid only when $d_1$ in the resulting $(d_1, d_2)=F^{31\ 1}(D_1)$ is equal to the random number $r_n$. Thus, this authentication system makes it impossible for a third party to make the chosen plaintext attack and the known plaintext attack on the encryption algorithm $E1K_i()$. Incidentally, the function $F()$ is one that satisfies the conditions listed below.

[Conditions for Function $F()$]

Condition 1: When x and y are determined, z which satisfies $z=F(x, y)$ is uniquely determined.

Condition 2: When z is determined, x and y which satisfy $z=F(x, y)$ are uniquely determined.

Condition 3: When r is used as a stochastic variable with x fixed, there is a low probability that any part of a binary-expanded series of $E1K_i(F(r, x))$ becomes or forms a fixed pattern.

Condition 4: When r is used as a stochastic variable with x fixed, there is a low probability that any part of a binary-expanded series of $E1K_i(F(x, r))$ forms a fixed pattern.

In another aspect, the present invention relates to a mutual authentication system in which a communication network and its all users have devices for implementing a common key cryptosystem; identifier $ID_i$ of a user named i is made public in said network; an authentication key $K_i$ of the user named i is known only to the network and the user named i; and in which each user generates a random number $r_c$, inputs into a specific function $F()$ the random number $r_c$ and the data $d_1$ mentioned in the above-described mutual authentication system of the invention, encrypts the resulting output $F(d_2, r_c)$ by an encryption algorithm $E2K_i()$ using the users' authentication key $K_i$ as a cipher key and sends the resulting data $C_2$ to the network; and the network inputs the received data $C_2$ into an inverse function $E_2^{-1}K_i()$ of the encryption algorithm $E2K_i()$ using the authentication key $K_i$ of the user concerned, inputs the resulting output $D_2$ into an inverse function $F()^{-1}$ and judges the user to be valid only when data $d_3$ in the resulting output $(d_3, d_4)=F^{-1}(D_2)$ is equal to the random number $r_u$ generated by the network. Thus, this mutual authentication system of the invention makes it impossible for a third party to make the chosen plaintext attack and the known plaintext attack on the encryption algorithm $E2K_i()$.

In still another aspect, the present invention relates to a cipher key delivery system in which a communication network and its all users have devices for implementing a common key cryptosystem; identifier $ID_i$ of a user named i is made public in said network; an authentication key $K_i$ of the user named i is known only to the network and the user named i; and in which the random numbers $r_u$ and $r_c$ and the data $d_2$ and $d_4$ used in the above-described mutual authentication systems are utilized; the network uses, as a cipher key for cipher communication, $G(r_u, d_4)$ obtained by inputting the random number $r_u$ and the data $d_4$ into a specific function $G()$; and the user concerned uses, as a cipher key for cipher communication, $G(d_2, r_c)$ obtained by inputting the data $d_2$ and the random number $r_c$ into the specific function $G()$. Thus, the cipher key delivery system of the invention is characterized in that no increase in the amount of data for communication is caused by the addition of the cipher key delivery feature to the network authentication system by the user and the user authentication system by the network described above.

Incidentally, the function $G()$ is one that satisfies the conditions listed below.

[Conditions for Function $G()$]

Condition 1: When x and y are determined, z which satisfies $z=F(x, y)$ is uniquely determined.

Condition 2: When x and y are determined, the data length of z which satisfies $z=F(x, y)$ matches with the data length of the cipher key for cipher communication.

BRIEF DESCRIPTION OF THE DRAWING

The present invention will be described in detail below with reference to the accompanying drawings, in which.

EMBODIMENT OF THE INVENTION

Figure 1:
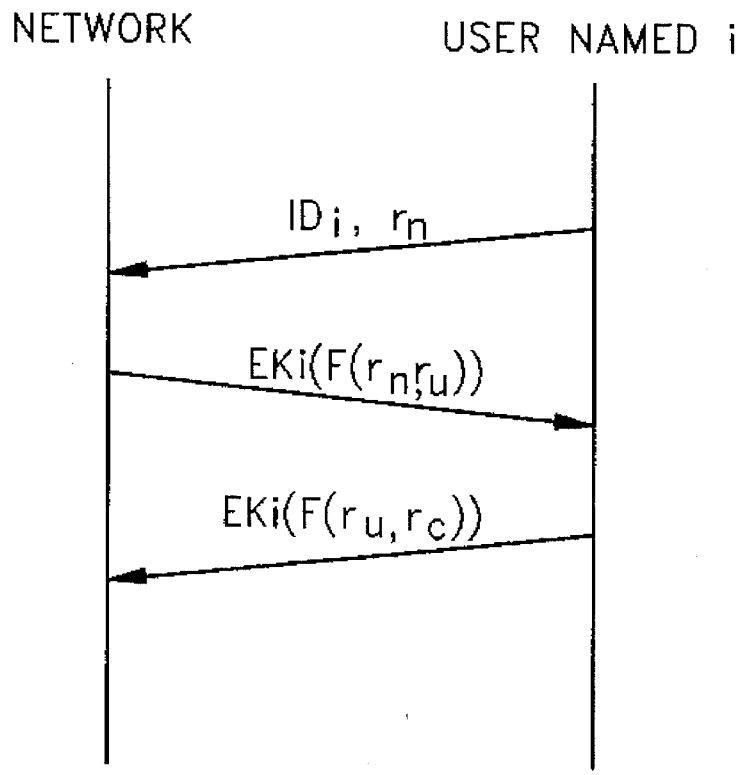
FIG. 1 is a flowchart explanatory of the operation of the present invention.
Figure 3:
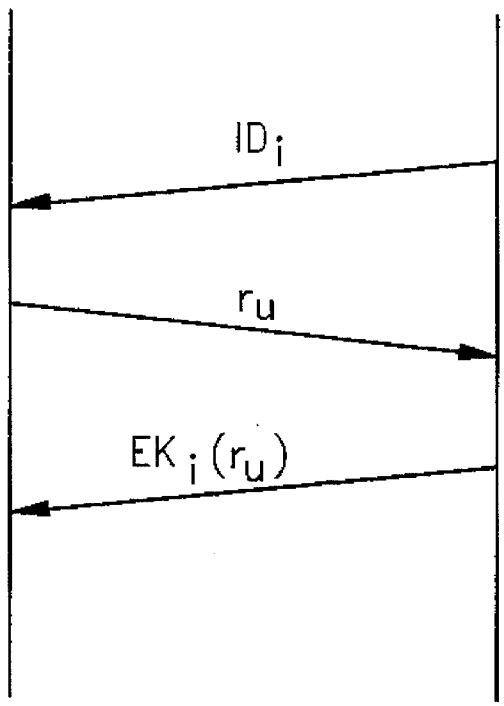
FIG. 3 is a flowchart explanatory of a conventional mutual authentication system.
Figure 2:
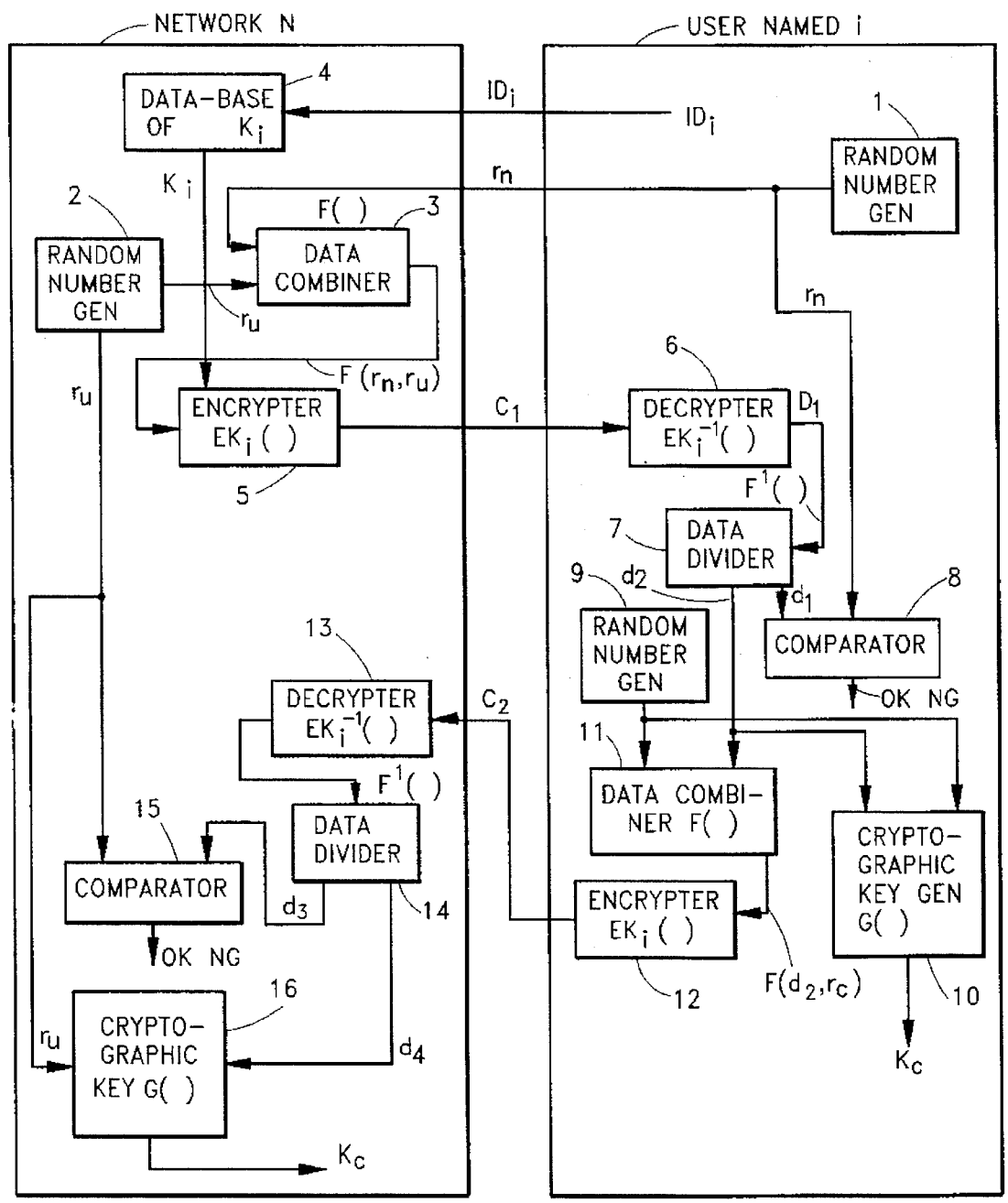
FIG. 2 is a block diagram illustrating an embodiment of the present invention.

Referring now to FIGS. 1 and 2, an embodiment of the present invention will be described in detail. A description will be given first of examples of variables and functions that are used in the embodiment. It is assumed that a random number $r_u$ generated by the network and a random number $r_n$ generated by each user are both 32-bit long. The encryption algorithms $E1()$, $E2()$ and $E3()$ mentioned previously, are assumed to be a DES encryption algorithm ECB mode which is a block encryption algorithm of a 64-bit block length, and these encryption algorithms will be represented by $E()$. When x and y are each input as a variable of 32 bits, the function $F()$ provides $x\|y=F(x, y)$ (a concatenation of 32-bit data x and 32-bit data y) and outputs a value of a 64-bit length. Similarly, the function $G()$ also provides $x\|y=G(x, y)$ (a concatenation of 32-bit data x and 32-bit data y) and outputs a value of a 64-bit length when x and y are each input as a variable of 32 bits.

Next, the operation of the present invention will be described. The user i generates the random number $r_u$ for network authentication by a random number generator 1. The user i presents his identifier $ID_i$ and the random number $r_n$ for authentication use to the network N.

Next, the network N generates the random number $r_u$ for user authentication by a random number generator 2. The network N encrypts $r_n\|r_u$, obtainable by the function $F()$ of an authentication information processing function generator (data combiner) 3, by an encryptor 5 in the ECB mode of the DES encryption algorithm, using as a cipher key the authentication key $K_i$ of the user available from a database 4 of $K_i$, the encrypted data $C_1$ of a 64-bit length being sent to the user.

The user is decrypts the data $C_1$ by a decrypter 6 in the ECB mode of the DES encryption algorithm, using his authentication key $K_i$ as a cipher key, obtains data $D_1$ ($=d_1\|d_2$) by an authentication information processing inverse function generator (data divider) 7 and makes a check by a comparator 8 to see if $d_1$ matches with $r_n$. When they do not match with each other, the user judges the network to be a false network and stops the implementation of the authentication protocol. When they match with each other, the user judges the network to be an authorized network, newly generates the random number $r_c$ by a random number generator 9, concatenates data $d_2$ and the random number $r_c$ by a cryptographic key generating function generator 10 to obtain $d_2\|r_c$ as a cipher key $k_c$ for cipher communication after authentication, encrypts $d_2\|r_c$ by an authentication information processing function generator (data combiner) 11 and an encrypter 12 in the ECB mode of the DES encryption algorithm using the user's authentication key $K_i$ as a cipher key and sends the encrypted data $C_2$ to the network.

The network N decrypts the data $C_2$ by a decrypter 13 and an authentication information processing inverse function generator (data divider) 14 in the ECB mode of the DES encryption algorithm using the user's authentication key $K_i$ as a cipher key and makes a check by a comparator 15 to see if $d_3$ in the decrypted data $D_2$ (=$d_3\|d_4$) matches with the random number $r_u$. Only when they match with each other, the network judges the user to be an authorized user and concatenates the random number $r_u$ and the data $d_4$ by a cryptographic key generator 16 to obtain $r_u\|d_4$ as the cryptographic key $k_c$ for cipher communication after authentication.

As described above in detail, the present invention prevents not only an unauthorized user from using the network but also a false network from stealing information for the authentication of an arbitrary user, and hence effectively provides increased security of the system. Furthermore, the present invention makes it impossible for an unauthorized third party to make the chosen plaintext attack and the known plaintext attack on the encryption function used, and hence substantially improves the system security as compared with the prior art. Besides, the system of the present invention can be implemented with only cryptographic equipment to the provided for the conventional common key cryptosystem art and, at the same time, permits the delivery of a cipher key for cipher communication although the number of interactions for communication is exactly the same as needed in the prior art. Thus, the introduction of the present invention will greatly contributes to future network security while the extra burden on the system is very slight.

What I claim is:

1. A mutual authentication system in which a communication network and all its users have devices for implementing a common key cryptosystem; identifier $ID_i$ of a user named i is made public in said network; an authentication key $K_i$ of the user named i is known only to the network and the user named i;

wherein said network obtains a value by processing, with a specific function, a random number generated by said each user for the authentication of said network and sent to said network and a random number generated by said network, encrypts said value, using said authentication key of said user concerned as a cipher key and sends the encrypted value to said user concerned; and wherein said network generates a data sequence for the authentication of each user and sends it to the user concerned, said user concerned decrypts it using his authentication key as a cipher key and processes the decrypted data with a specific function, processes a part of said processed data and a newly generated random number with another specific function, encrypts the processed value, using said authentication key of said user concerned as a cipher key and sends the encrypted data to said network, thereby making it impossible for a third party to make a chosen plaintext attack and a known plaintext attack on the encryption algorithm used.

2. A cipher key delivery system for said mutual authentication system claimed in claim 1, in which a communication network and all its users have devices for implementing a common key cryptosystem; identifier $ID_i$ of a user named i is made public in said network; an authentication key $K_i$ of the user named i is known only to the network and the user named i; characterized in that a data sequence, obtained by inputting into a specific function a random number generated by said network for authentication and a random number generated by the user concerned for authentication, is shared as a cipher key for cipher communication by said network and said user concerned, thereby preventing the amount of data for communication from being increased by the addition of a cipher key delivery feature to said mutual authentication algorithm.

* * * * *